(12) United States Patent
De Capoa et al.

(10) Patent No.: US 10,360,012 B2
(45) Date of Patent: Jul. 23, 2019

(54) DYNAMIC SELECTION OF DEPLOYMENT CONFIGURATIONS OF SOFTWARE APPLICATIONS

(71) Applicant: International Business Machines Corporation, Armonk, NY (US)

(72) Inventors: Gabriele De Capoa, Rome (IT); Rossella De Gaetano, Rome (IT); Fausto Ribechini, Rome (IT); Valerio Riva, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 15/808,114

(22) Filed: Nov. 9, 2017

(65) Prior Publication Data
US 2019/0138287 A1 May 9, 2019

(51) Int. Cl.
*G06F 8/61* (2018.01)

(52) U.S. Cl.
CPC .................................. *G06F 8/64* (2013.01)

(58) Field of Classification Search
CPC ..... G06F 8/60; G06F 8/61; G06F 8/63; G06F 8/64; G06F 8/65; G06F 8/656; G06F 8/658; G06F 8/70; G06F 9/455; G06F 9/45558; G06F 2009/45591
USPC .................................. 717/168–178
See application file for complete search history.

(56) References Cited

U.S. PATENT DOCUMENTS

| | | | | |
|---|---|---|---|---|
| 6,985,939 B2* | 1/2006 | Fletcher | ................ | G06F 8/20 707/999.002 |
| 7,103,874 B2* | 9/2006 | McCollum | ................ | G06F 8/36 709/220 |
| 8,191,043 B2* | 5/2012 | Mohindra | ................ | G06F 8/36 709/218 |

(Continued)

OTHER PUBLICATIONS

Eidson Thomas M.. 2001. A Component-Based Programming Model for Composite, Distributed Applications. Technical Report. Institute for Computer Applications in Science and Engineering (ICASE). (Year: 2001).*

(Continued)

*Primary Examiner* — Andrew M. Lyons
(74) *Attorney, Agent, or Firm* — Schmeiser, Olsen & Watts, LLP; David Woycechowsky

(57) ABSTRACT

A method and system are for deploying a software application. The software application is deployed in a default deployment configuration onto a computing system. The default deployment configuration includes interacting software components of the software application. One or more operating indicators of an execution environment of the software application are monitored. From the monitored one or more operating indicators, it is ascertained that a critical condition of the execution environment exists. In response to having ascertained that the critical condition exists, an alternative deployment configuration is selected from one or more alternative deployment configurations of the software application, each alternative deployment configuration having one or more groups of the software components aggregated into corresponding aggregated software components. The software application is re-deployed in the selected alternative deployment configuration onto the computing system.

20 Claims, 6 Drawing Sheets

(56) References Cited

U.S. PATENT DOCUMENTS

| | | | | |
|---|---|---|---|---|
| 8,225,308 B2* | 7/2012 | Sedukhin | G06F 8/70 | |
| | | | 709/220 | |
| 8,677,318 B2* | 3/2014 | Mohindra | G06F 8/61 | |
| | | | 709/218 | |
| 8,997,086 B2* | 3/2015 | Deckert | G06F 8/61 | |
| | | | 717/172 | |
| 9,152,403 B2 | 10/2015 | Jacobson et al. | | |
| 9,256,344 B1* | 2/2016 | Gulasky | G06F 8/41 | |
| 9,442,476 B2 | 9/2016 | Bliss et al. | | |
| 9,495,152 B2* | 11/2016 | Suit | G06F 9/5077 | |
| 9,588,749 B2 | 3/2017 | Chen et al. | | |
| 10,117,116 B1* | 10/2018 | Shaw | H04W 76/10 | |
| 10,133,619 B1* | 11/2018 | Nagpal | G06F 11/079 | |
| 2007/0168960 A1* | 7/2007 | Carey | G06F 8/656 | |
| | | | 717/120 | |
| 2008/0141234 A1 | 6/2008 | Becker et al. | | |
| 2008/0235001 A1* | 9/2008 | Cohen | G06F 9/30174 | |
| | | | 703/26 | |
| 2009/0119501 A1* | 5/2009 | Petersen | G06F 8/65 | |
| | | | 713/100 | |
| 2009/0276771 A1* | 11/2009 | Nickolov | G06F 9/4856 | |
| | | | 717/177 | |
| 2011/0126192 A1* | 5/2011 | Frost | G06F 8/61 | |
| | | | 717/178 | |
| 2011/0321024 A1* | 12/2011 | Knothe | G06F 8/656 | |
| | | | 717/168 | |
| 2012/0079497 A1* | 3/2012 | Gangemi | G06F 9/5011 | |
| | | | 718/104 | |
| 2012/0203536 A1* | 8/2012 | Gangemi | G06F 9/455 | |
| | | | 703/22 | |
| 2013/0232480 A1* | 9/2013 | Winterfeldt | G06F 8/60 | |
| | | | 717/177 | |
| 2014/0101428 A1* | 4/2014 | Bennah | G06F 8/63 | |
| | | | 713/100 | |
| 2014/0136711 A1* | 5/2014 | Benari | G06F 9/5061 | |
| | | | 709/226 | |
| 2015/0222485 A1* | 8/2015 | Key | H04L 67/02 | |
| | | | 709/221 | |
| 2015/0378765 A1* | 12/2015 | Singh | G06F 9/45558 | |
| | | | 718/1 | |
| 2016/0191611 A1* | 6/2016 | Srinivasan | H04L 67/10 | |
| | | | 709/201 | |
| 2017/0017655 A1* | 1/2017 | Pinto | G06F 8/33 | |
| 2017/0177319 A1* | 6/2017 | Mark | G06F 8/61 | |
| 2017/0315859 A1* | 11/2017 | Marshall | G06F 9/45558 | |
| 2017/0351868 A1* | 12/2017 | Jacob | G06F 8/65 | |
| 2017/0364380 A1* | 12/2017 | Frye, Jr. | G06F 9/45558 | |
| 2018/0267833 A1* | 9/2018 | Chen | G06F 9/505 | |
| 2018/0373521 A1* | 12/2018 | Huang | G06F 9/5061 | |

OTHER PUBLICATIONS

Abdelmadjid Ketfi and Noureddine Belkhatir. 2005. Model-driven framework for dynamic deployment and reconfiguration of component-based software systems. In Proceedings of the 2005 symposia on Metainformatics (MIS '05). ACM, New York, NY, USA, Article 8. DOI=http://dx.doi.org/10.1145/1234324.1234332 (Year: 2005).*

B. Ravindran, "Engineering dynamic real-time distributed systems: architecture, system description language, and middleware," in IEEE Transactions on Software Engineering, vol. 28, No. 1, pp. 30-57, Jan. 2002. (Year: 2002).*

W. N. Robinson, "Implementing Rule-Based Monitors within a Framework for Continuous Requirements Monitoring," Proceedings of the 38th Annual Hawaii International Conference on System Sciences, Big Island, HI, USA, 2005, pp. 188a-188a. (Year: 2005).*

* cited by examiner

DYNAMIC SELECTION OF DEPLOYMENT CONFIGURATIONS OF SOFTWARE APPLICATIONS

TECHNICAL FIELD

The present invention relates to information technology, and more particularly, to management of software applications.

BACKGROUND

Software applications are more and more complex. Therefore, the software applications generally have a modular architecture, wherein each software application comprises multiple software components that interact among one another. The modular architecture breaks down the complexity of the software application, thereby significantly facilitating management (for example, design, development and maintenance) of the software application.

Moreover, different deployment configurations of each software application may be provided (for example, by building the software application according to corresponding settings), so that a system administrator may use the deployment configuration of the software application that is best suited to different execution environments (for example, test, production).

A typical example is in a cloud (computing) environment. The (cloud) software applications are supplied as services to users by cloud providers, which provision, configure and release corresponding computing resources upon request (so that actual implementation of the software applications is completely opaque to the users). This de-coupling of the software applications from the actual computing resources that implement the software applications provides the illusion of an infinite capacity thereof and improves exploitation of the software applications, especially for high-peak load conditions (by means of economies of scale). Moreover, the users are now relieved of the management of these computing resources (for example, installation and maintenance of these computing resources), and the users may perform tasks (on a pay-per-use basis) that were not feasible previously because of cost and complexity of these computing resources (especially for individuals and small companies).

The software components of each software application generally implement corresponding (micro) services. Each micro-service may invoke the other micro-services of the software application (in addition to external services) to provide the required functionality. The software application may then be deployed in a plurality of instances (for example, onto corresponding data centers distributed geographically) so that, a load balancer of the corresponding cloud provider may serve every request of the users with the instances of the software application that are closest to the cloud provider so as to increase responsiveness. Moreover, each instance of the software application may be deployed with multiple instances of the software application's software components implementing the micro-services, which allows distributing the workload of the software application and provides redundancy to increase reliability.

Different issues may adversely affect operation of the software application. Nevertheless, even if a situation all the instances of a software component become not available in a specific instance of the software application, the software application may continue working by invoking the corresponding micro-service (remotely) onto the other instances of the software application.

However, the preceding situation may degrade the performance of the software application. For example, a micro-service may now be invoked remotely onto an instance of the software application that is deployed in a data center far away from the data center of the software application wherein the micro-service is not available (for example, the micro-service is located in another continent). Therefore, a corresponding transmission time between these data centers adversely affect a response time of the software application accordingly, which may create a congestion in the instance of the software application such that the micro-service is invoked remotely, which degrades the response time as well.

SUMMARY

Embodiments of the present invention provide a method, and associated computer system and computer system, for deploying a software application. The software application is deployed in a default deployment configuration onto a computing system, said default deployment configuration comprising a plurality of interacting software components of the software application. One or more operating indicators of an execution environment of the software application are monitored. From the monitored one or more operating indicators, it is ascertained that a critical condition of the execution environment exists. In response to having ascertained that the critical condition exists, an alternative deployment configuration is selected from one or more alternative deployment configurations of the software application, each alternative deployment configuration having one or more groups of the software components aggregated into corresponding aggregated software components. The software application is re-deployed in the selected alternative deployment configuration onto the computing system.

DETAILED DESCRIPTION

FIGS. 1A-1D illustrate embodiments of the present invention.

Figure 1A:
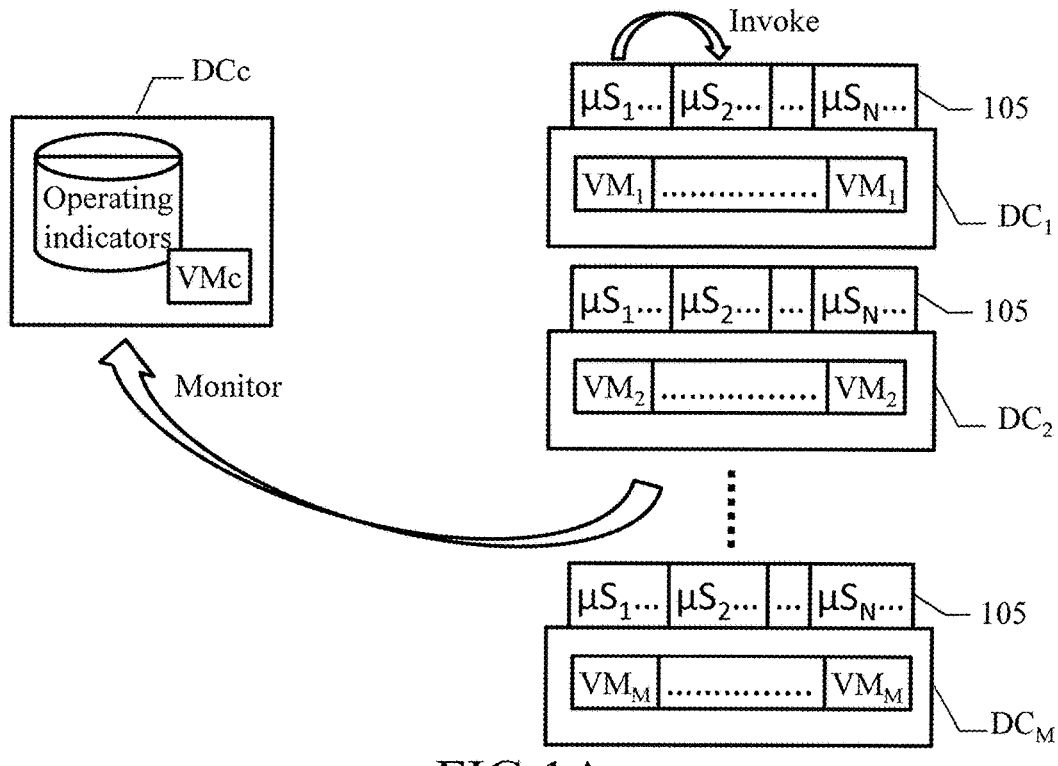
FIGS. 1A-1D illustrate embodiments of the present invention.

With respect to FIG. 1A, a software application 105 is deployed onto a computing system in a default deployment configuration.

For example, the software application 105 is of the cloud type (supplied as a service in a cloud environment by a corresponding cloud provider), such as implementing an e-commerce portal. The software application comprises multiple software components $\mu S_1$-$\mu S_N$ that implement corresponding services, denoted with the same references (each providing a stand-alone basic functionality, independent of implementation of the software application, which may be requested through a well-defined interface according to corresponding policies controlling its usage). In one embodiment, the services $\mu S_1$-$\mu S_N$ are of the micro type. The micro-services $\mu S_1$-$\mu S_N$ are small in size, fine-grained (to perform a single function), independently deployable and accessible through a lightweight protocol (like HTTP).

In general, the cloud provider supplies a pool of (hardware and/or software) computing resources as cloud services (i.e., shared computing resources that may be provisioned, configured and released very rapidly). The computing resources of the cloud services (which may be of the virtual type; i.e., emulations by software of physical resources) are supplied upon request to users of the cloud provider, so that each user has sole control of these computing resources (which may then be used exactly as if these computing resources were dedicated to each user. These services comprise the software application 105 that is provided, in one embodiment, according to a Software as a Service (SaaS) model.

In the default deployment configuration, the software application 105 is deployed in one or more instances onto one or more data centers DC1-DCM of the cloud provider of cloud services. For example, each instance of the software application 105 is installed onto a corresponding data center DC1-DCM. More specifically, one or more instances of each software component $\mu S1$-$\mu SN$ is installed onto corresponding (execution) computing machines, for example, virtual machines VM1-VMM of the data center DC1-DCM. The default configuration has been selected (during the development of the software application) to provide the desired level of reliability with respect to the distribution of its functionality among the micro-services $\mu S1$-$\mu SN$.

In operation, the micro-services $\mu S1$-$\mu SN$ may invoke each other. (such as according to the RESTful specification). For example, the micro-service $\mu S1$ invokes the micro-service $\mu S2$ (locally in the data center DC1) when the micro-service $\mu S1$ requires the functionality of the micro-service $\mu S2$. At the same time, one or more operating indicators of an execution environment of the software application 105 are monitored by a specific (control) computing machine; for example, a virtual machine VMc of a corresponding data center of the cloud provider, differentiated with the reference DCc, running a cloud manager that manages the whole cloud provider. For example, the control virtual machine VMc periodically collects performance indicators, configuration indicators and availability indicators relating to the instances of the software application 105, the data centers DC1-DCM, and connections among the data centers DC1-DCM.

Figure 1B:
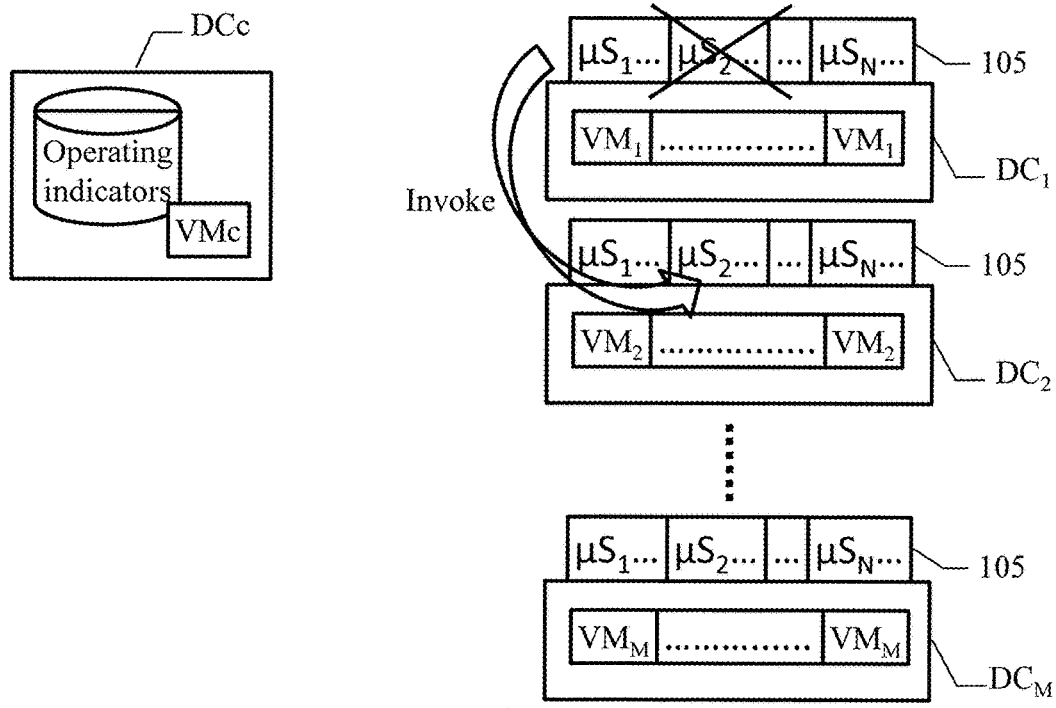

With respect to FIG. 1B, an issue adversely affecting operation of the software application 105 occurs. For example, all the instances of a micro-service (e.g., the micro-service $\mu S2$) go down in a specific instance of the software application 105 (e.g., on the data center DC1). Nevertheless, the instance of the software application 105 on the data center DC1 may continue working by invoking the same micro-service $\mu S2$ onto other instances of the software application 105. For example, the micro-service $\mu S1$ now invokes the micro-service $\mu S2$ remotely from the data center DC1 onto the data center DC2.

Figure 1C:
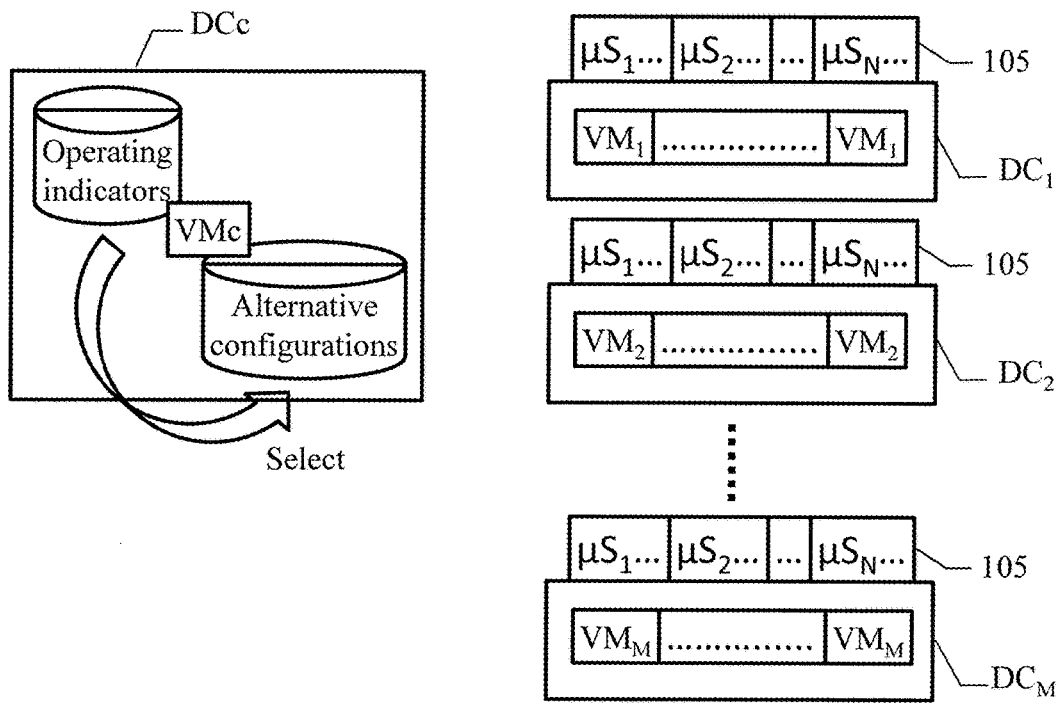

With respect to FIG. 1C, in accordance with embodiments of the present invention, a critical condition of the execution environment of the software application 105 may be detected according to operating indicators of the software application that are monitored by the control virtual machine VMc. For example, the critical condition is defined by all the instances of the micro-service $\mu S2$ that are not available on the data center DC1 and a connection between the data center DC 1 and the data center DC2 that is slow (for example, because the data centers DC 1 and DC2 are located in different continents), resulting in a corresponding performance degradation of the software application 105. In response to the performance degradation, a (selected) alternative deployment configuration of the software application 105 is selected among one or more alternative deployment configurations of the software application 105. Each of the alternative deployment configurations of the software application 105 has one or more groups of software components $\mu S1$-$\mu SN$ that are aggregated into corresponding aggregated software components. Each aggregated software component provides the same functionalities of the corresponding software components, with the same interface for invoking micro-services. For example, the selected alternative deployment configuration comprises an aggregated software component $\mu S12$ instead of the (separate) software components $\mu S1$ and $\mu S2$.

Figure 1D:
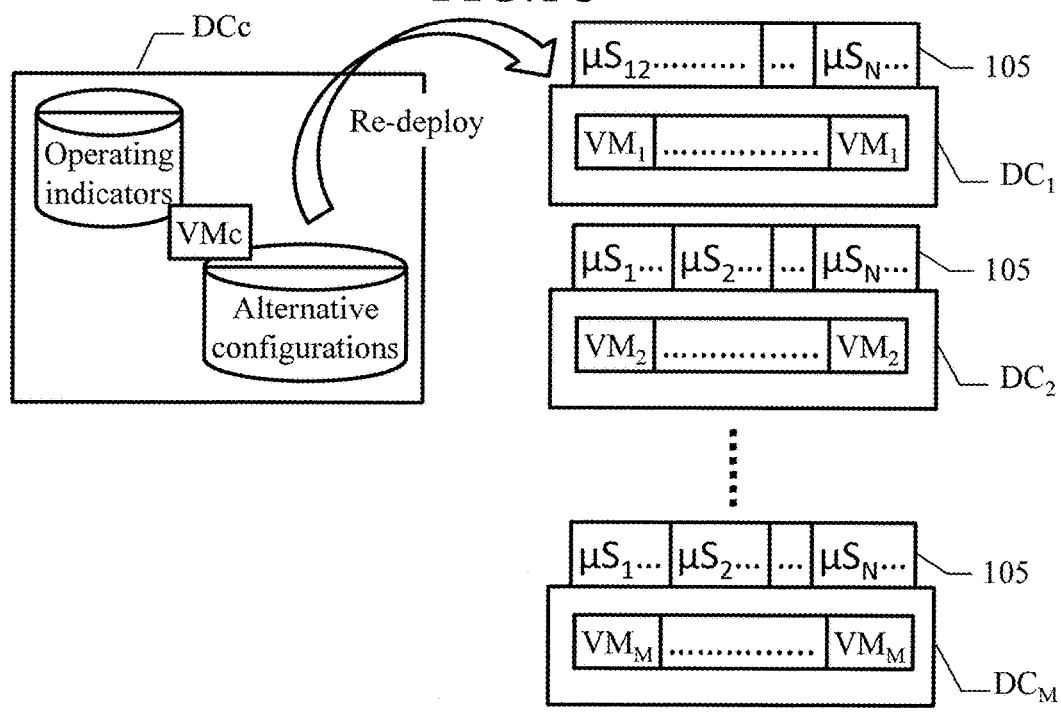

With respect to FIG. 1D, the software application 105 is re-deployed (re-staged) in the selected alternative deployment configuration. Particularly, in the instance of the software application 105 on the data center $DC_1$, the software components $\mu S_1$ and $\mu S_2$ are replaced by corresponding instances of the aggregated software component $\mu S_{12}$. Therefore, any invocation of the micro-service $\mu S_2$ by the micro-service $\mu S_1$ is now performed directly within the aggregated software component $\mu S_{12}$ (i.e., locally in the data center $DC_1$). However, the instance of the software application 105 on the data center $DC_1$ exposes exactly the same behavior to the users and to the other instances of the software application 105, so that the change of its deployment configuration is completely opaque (i.e., not transparent) to the users.

As a result, the deployment configuration of the software application dynamically adapts to the software application's execution environment which significantly increases the performance of the software application. Particularly, the aggregation of the software components avoids (or at least substantially reduces) the remote invocations of the micro-services, and subsequently the corresponding communications among different data centers (such as for invoking the micro-service $\mu S2$ onto the data center DC2 by the micro-service $\mu S1$ on the data center DC1 in the present example), which avoids (or at least substantially reduces) any congestion in the instances of the software application wherein the micro-services are invoked remotely, thereby improving the software application's response time as well (such as the instance of the software application 105 on the data center DC2 in the present example).

Figure 2:
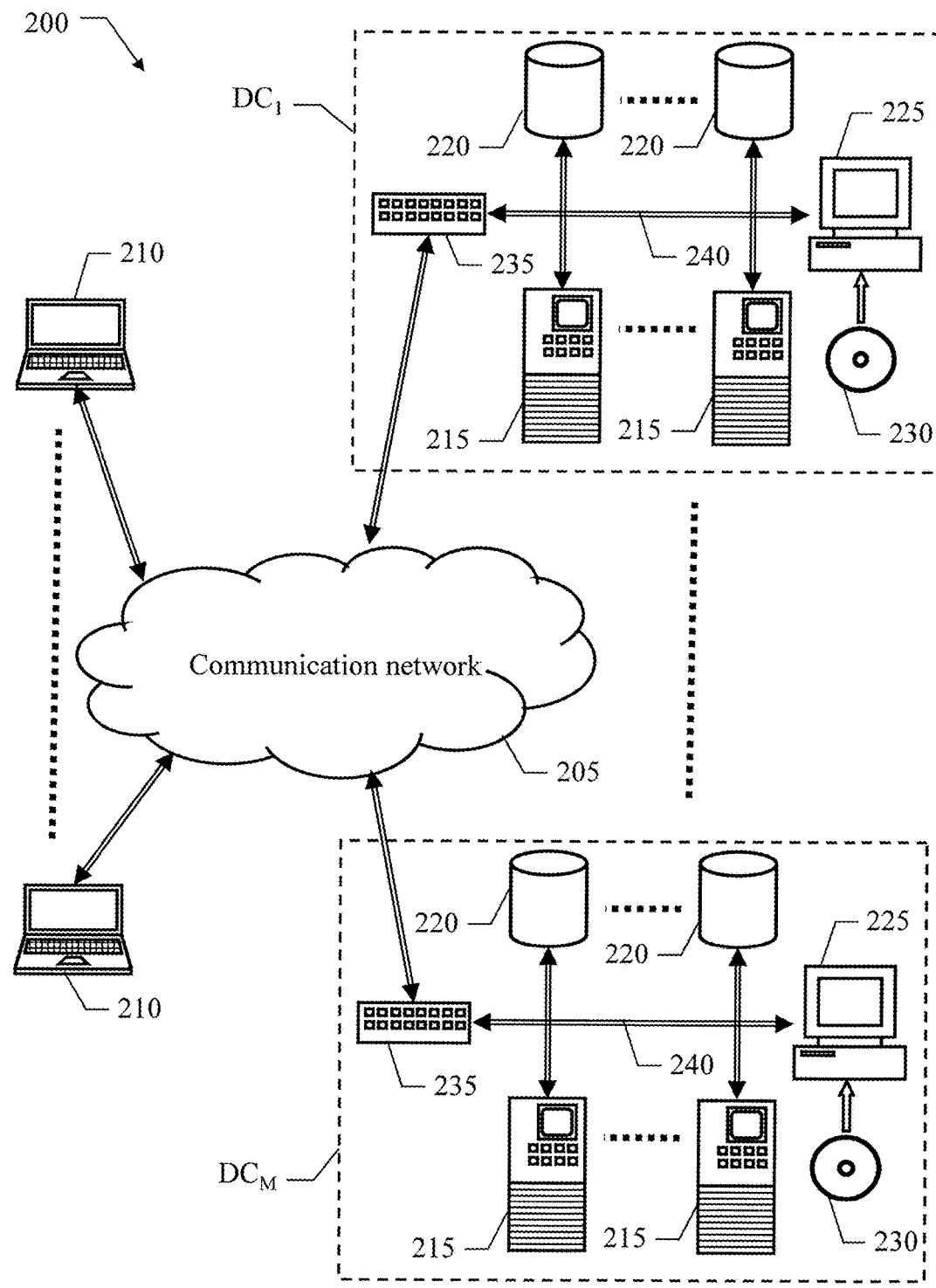
FIG. 2 shows a schematic block diagram of a computing system configured to implement embodiments of the present invention.

FIG. 2 shows a schematic block diagram of a computing system 200 configured to implement embodiments of the present invention.

The computing system 200 comprises the data centers DC1-DCM of the cloud provider (hosting execution virtual machines and a control virtual machine, not shown in FIG. 2). The data centers DC1-DCM communicate among one another via a communication network 205. For example, the communication network 205 may be of global type (typically based on the Internet) when the corresponding cloud services (comprising the above-mentioned software application) are provided according to a public cloud model by the cloud provider. In this case, the users connect to the cloud provider by accessing the same communication network 205 with the users' client computing machines, or simply clients 210 (for example, of the thin type). Thus, the cloud provider exposes a front-end sub-system for accessing the software application (for example, via a web browser of the clients 210). The cloud provider instead has a back-end sub-system that actually implements the cloud services. The back-end sub-system is not accessible from the outside, so that the users are completely agnostic about the location and configuration of the back-end sub-system.

Each data center DC1-DCM comprises several server computing machines, or simply servers 215 (for example, of the rack or blade type) and storage disks 220 (for example, of the RAID type) implementing mass-memories. In turn, each server 215 comprises one or more microprocessors (μP) controlling each server's operation, a non-volatile memory (ROM) storing basic code for a bootstrap thereof, and a volatile memory (RAM) used as a working memory by the microprocessors (not shown in FIG. 2). The data center DC1-DCM also comprises a console 225 for controlling the data center's server computing machines (for example, a personal computer, also provided with a drive for reading/writing removable storage units 230, such as optical disks like DVDs). A switch/router sub-system 235 manages any communications among the servers 215, the disks 220, and the console 225, and with the communication network 205. The servers 215, the disks 220, and the console 225 are connected to the switch/router sub-system 235 through a cabling sub-system 240.

Figure 3:
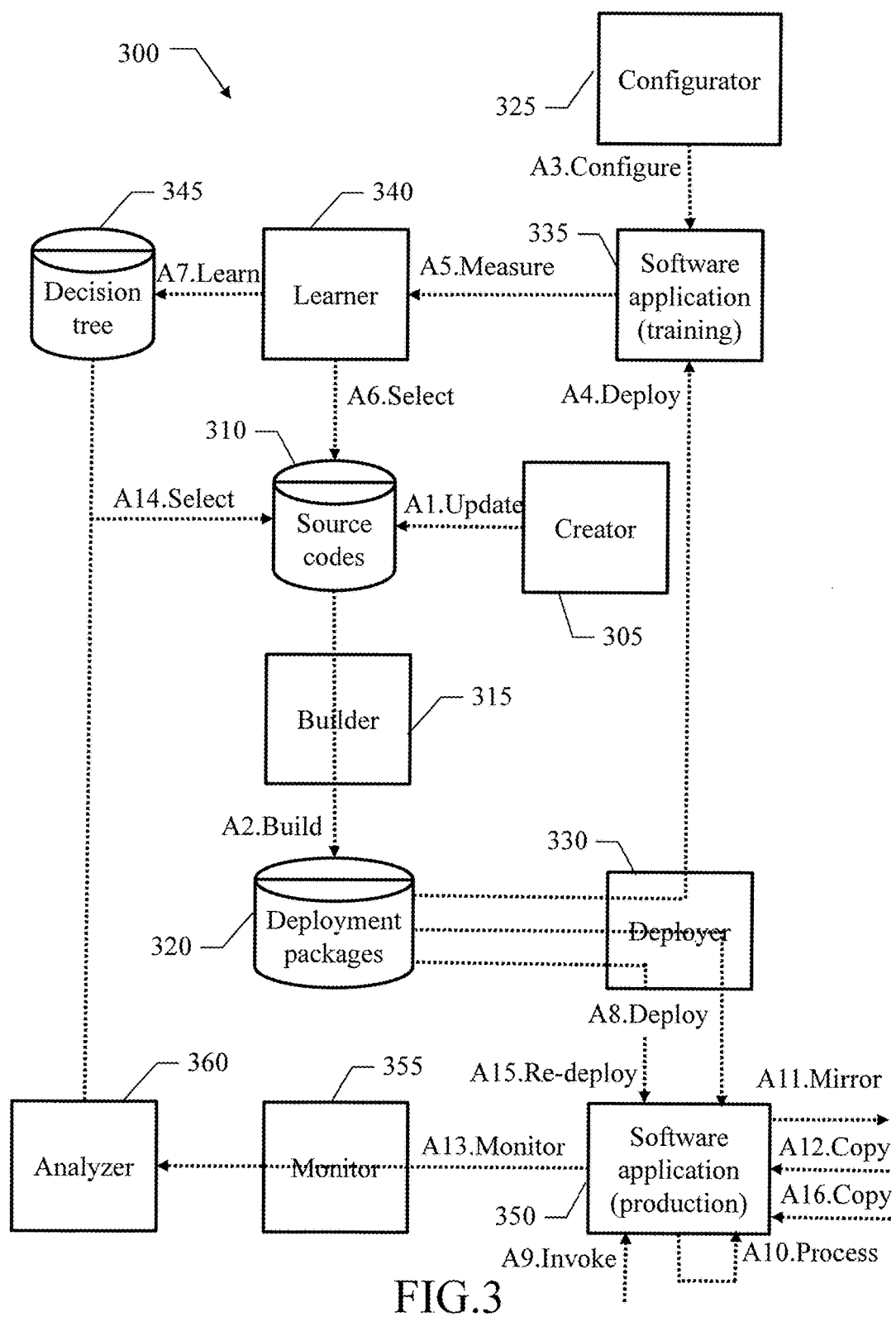
FIG. 3 shows a diagram including software components that may be used to implement embodiments of the present invention.

FIG. 3 shows a diagram including software components that may be used to implement embodiments of the present invention.

All the software components (programs and data) are denoted as a whole with the reference 300. The software components are typically stored in the mass memory and loaded (at least partially) into the working memory of the control virtual machine when the programs are running, together with an operating system and other application programs (not shown in FIG. 3). The programs are initially installed into the mass memory, for example, from removable storage units or from the communication network. In this respect, each program may be a module, segment or portion of code, which comprises one or more executable instructions for implementing the specified logical function. Particularly, the diagram represents both the static structure of the software components 300 and dynamic behavior of the software components 300 by means of a series of exchanged messages, each exchange message representing a corresponding action (denoted with sequence numbers preceded by the symbol "A").

Particularly, a creator 305 retrieves an original version of a source code of the software application from a source code repository 310 wherein the source code has been added to the source code repository 310 by a corresponding development team. The creator 305 updates the source code to define multiple candidate deployment configurations of, to be used for selecting the alternative deployment configurations of the software application (for example, corresponding to all the possible aggregations of a predefined number of its software components, such as 2-4 software components). Particularly, a configuration variable myConfiguration is introduced for selecting the deployment configurations. The configuration variable myConfiguration may take different values corresponding to the default deployment configuration and to the candidate deployment configurations. The creator 305 updates the source code for incorporating the corresponding software components into each aggregated software component selectively. For example, a switch statement controlled by the configuration variable myConfiguration is added at the beginning of each (first) software component for each value of the configuration variable myConfiguration different from the value of the default deployment configuration. If the corresponding candidate deployment configuration aggregates one or more (second) software components with the first software component, an instruction is added to incorporate the code of the second software components into the first software component. Moreover, the creator 305 updates the source code for invoking the software components remotely or locally selectively. For example, every remote invocation of each second software component (like a RESTful call) in the first software component is replaced with a switch statement again controlled by the configuration variable myConfiguration. The switch statement causes the remote invocation of the second software component when the configuration variable myConfiguration indicates the default deployment configuration or a candidate deployment configuration wherein the second software component remains separate from the first software component, whereas the switch statement causes a native, i.e., local, invocation (like a function call) of the second software component when the configuration variable myConfiguration indicates a candidate deployment configuration wherein the second software component is aggregated with the first software component. For example, a very simple software component implementing a function myFunction1 of a micro-service μS1 that invokes a function myFunction2 of a micro-service μS2 and a function myFunction3 of a micro-service μS3 may have the following pseudo code originally:

function myFunction1 {
. . .
Do. Post(μS$_2$.myFunction2)
. . .
Do.Post((μS$_3$.myFunction3)
. . .
}.

In case of a candidate deployment configuration aggregating the software components μS$_1$ and μS$_2$ into an aggregated software component μS$_{12}$ (indicated by the configuration variable myConfiguration=12) and another candidate deployment configuration aggregating the software components μS$_1$ and μS$_3$ into an aggregated software component μS$_{13}$ (indicated by the configuration variable myConfiguration=13), in addition to the default deployment configuration with the software components μS$_1$ and μS$_2$ that are separate (indicated by the configuration variable myConfguration=0), the pseudo code becomes:

SELECT myConfiguration
CASE 12: include(μS$_2$)
CASE 13: include(μS$_3$)
END SELECT
function myFunction1 {
. . .
SELECT myConfiguration
   CASE 0: Do.Post(μS$_2$.myFunction2)
   CASE 12: μS$_2$.myFunction2
   CASE 13: Do.Post(μS$_2$.myFunction2)
END SELECT
. . .
SELECT myConfiguration
   CASE 0: Do.Post(μS$_3$.myFunction3)
   CASE 12: Do.Post(μS$_3$.myFunction3)
   CASE 13: μS3.myFunction3
END SELECT
. . .
}.

The creator 305 replaces the original version of the source code of the software application with the updated version of the source code into the source code repository 310 (action "A1.Update"). A builder 315 builds different deployment packages of the software application (for deployment of the software application) from the software application's source code retrieved from the source code repository 310 according to a current value of the configuration variable myConfiguration (for example, implemented by a build tool of a software development application). The builder 315 adds each deployment package of the software application (for example, in the form of a corresponding virtual appliance) to a deployment package repository 320, temporary for the time required for deployment of the software application (action "A2.Build").

During a training phase of the software application (before putting the software application into production), a configurator 325 configures different training (execution) environments of the software application. Each training environment has different values of the operating indicators (used to select the alternative deployment configurations of the software application). For example, the configurator 325 configures the training environment with different values of one or more performance indicators such as bandwidth of connections among the data centers and available processing powers of the servers of the data centers, of one or more configuration indicators such as number of hops of the connections among the data centers and amount of working memory of the execution virtual machines and/or of one or more availability indicators such as availability of microservices and of connections among the data centers (action "A3.Configure").

A deployer 330 is used to deploy the software application onto the computing system by means of a deployment package retrieved by the deployer 330 from the deployment package repository 320. Particularly, during the training phase of the software application, the deployer 330 deploys the software application 335, in every training deployment configuration comprising the default deployment configuration and every candidate deployment configuration (after the software application's deployment package has been built at runtime by the builder 315), onto every training environment in succession (action "A4.Deploy"). A learner 340 learns a selection policy for selecting the alternative deployment configurations of the software application. The learner 340 measures one or more performance indicators of the software application 335 (for example, an average response time of the software application to a benchmark request) in every training deployment configuration on every training environment (action "A5Measure"). The learner 340 then selects the alternative deployment configurations among the candidate deployment configurations according to the operating indicators of the training environments and to the corresponding performance indicators of the software application 335 in the training deployment configurations. For example, for every training environment, the learner 340 selects the candidate deployment configuration providing the best performance indicators of the software application 335 (i.e., the lowest average response time in this case) only if the performance indicators of the software application 335 in the default configuration are exceeded by a threshold value (such as 10-20%). Once all the training environments have been processed, the candidate deployment configurations of the software application that have been selected define the alternative deployment configurations. Thus, the alternative deployment configurations are limited to the deployment configurations that are likely to be actually useful in practice. At this point, if desired, the learner 340 may also simplify the source code of the software application in the source code repository 310 by removing the portions of the source code corresponding to the candidate deployment configurations that have not been selected (action "A6.Select"). In any case, the learner 340 determines the selection policy (for selecting the default deployment configuration or the alternative deployment configurations of the software application) according to the operating indicators of the training environments and to the corresponding performance indicators of the software application 335. For example, the learner 340 applies machine learning techniques to create a decision tree defining the selection policy. The decision tree comprises multiple decision nodes (starting from a root test node). Each decision node specifies a test of one or more operating indicators, with two or more branches descending from the decision node that correspond to the possible values of these operating indicators. Each leaf node of the decision tree specifies a default/alternative deployment configuration of the software application by means of the corresponding value of the configuration variable myConfiguration. The default/alternative deployment configuration is the deployment configuration that is expected to provide the best performance indicators of the software application (with the above-mentioned margin) for the values of the operating indicators along the path from the root test node to the leaf node. The learner 340 stores a representation of the decision tree so obtained into a decision tree file 345 (action "A7.Learn").

Afterwards, the software application is put into production. At the beginning, the deployer 330 deploys the software application 350, in the default deployment configuration (after the deployment package has been built at runtime by the builder 315) onto a (production) execution environment of the computing system (action "A8.Deploy"). At runtime, each instance of each software component of the software application may be invoked by the instances of the other software components and/or by the users of the software application (not shown in FIG. 3) for submitting corresponding requests (action "A9.Invoke"). This instance of the software component processes (serves) each request accordingly. Particularly, the software component may be either stateless or stateful. When the software component is stateless, each request is processed independently without retaining any (session) data relating to requests that have been processed previously (so that the instance of the software component is completely replaceable). Conversely, when the software component is stateful, the instance of the software component retains session data for processing multiple requests in each session with a corresponding user according to the history reflected in the session data. The session data is discarded once the session is closed (action "A10.Process"). According to an embodiment of the present invention, the session data are mirrored into one or more other locations, different from the (first) execution virtual machine wherein the (first) instance of the software component is deployed. For example, the session data are mirrored into one or more (mirroring) virtual machines comprising the control virtual machine and/or other execution virtual machines (not shown in FIG. 4), by sending corresponding notifications thereto whenever any session is opened, its session data are updated, and the session is closed (action "A1.Mirror"). In this case, any pending sessions of the first instance of the software component may be moved to another (second) instance of the same software component in another (remote) instance of the software application (not shown in FIG. 3) to continue processing which may happen when all the instances of the software component go down (i.e., abort) in a (first) data center and operation is taken over by the instances of the software component in another (second) data center (or vice-versa when the instances of the software component go up again in the first data center and their operation returns from the instances of the software component in the second data center to the instances of the software component in the first data center). In response, the second instance of the software component identifies the location of the corresponding session data that is closest to the location of the second instance of the software component (for example, according to physical and/or logical parameters such as geographical distance and transmission speed, respectively). The second instance of the software component then copies the session data locally onto the corresponding (second) virtual machine from this closest location, so as to restart the processing of the pending sessions seamlessly, with any next requests for the first instance of the software component that are submitted to its second instance from now on to process the corresponding sessions as above (action "A12.Copy").

In any case, at the same time in the solution according to an embodiment of the present invention, a monitor 355 monitors the operating indicators of the execution environment of the software application. The monitor 355 passes the operating indicators that have been collected at every monitoring instant (for example, every 30-120 seconds) to an analyzer 360 (action "A13.Monitor"). The analyzer 360 selects the (default/alternative) deployment configuration of the software application corresponding to the operating indicators of every monitoring instant, according to the decision tree retrieved from the decision tree file 345. The analyzer 360 tests the operating indicators specified in the root test node, moves down the branch corresponding to their value and repeats the same operations until a leaf node is reached. This leaf node than indicates the (selected) deployment configuration that is likely to provide the best performance of the software application 350 in the current condition of the software application's execution environment defined by the operating indicators. Particularly, when the operating indicators signify that the execution environment is likely to be in a critical condition (wherein the performance of the software application 350 may degrade significantly), the sorting down of the decision tree selects one of the alternative deployment configurations since the selected alternative deployment configuration is expected to improve the performance of the software application 350. Conversely, when the operating indicators signify that the execution environment is likely to be in a default condition (wherein the performance of the software application 350 should be as expected), the sorting down of the decision tree selects the default deployment configuration (action "A14.Select"). Whenever the selected deployment configuration is different from a current deployment configuration of the software application 350, the deployer 330 re-deploys the software application 350 in the selected deployment configuration (after the deployment package of the software application has been built at runtime by the builder 315) onto the execution environment of the computing system. Therefore, when the execution environment passes to any critical condition (from the default condition or from another critical condition), the software application 350 is re-deployed in the corresponding alternative deployment configuration (to avoid, or at least reduce, the expected degradation of the performance of the software application 350). Conversely, when the execution environment passes to the default condition from any critical condition, the software application 350 is re-deployed in the default deployment configuration. As a result, the software application 350 returns to the default deployment configuration as soon as possible. Once the critical condition that was likely to reduce the performance of the software application 350 has been removed, the software application 350 has again all the software application's software components that are separate, thereby restoring the software application's original level of reliability (action "A15.Re-deploy"). The re-deployment of the software application may cause the movement of any pending sessions, which occurs, for example, when an instance of a software component, whose operation is currently taken over by a (first) instance of the software application in another (remote) instance of the software application, is aggregated into a corresponding instance of an aggregated software component (locally) to get retrieve the software application's operation. As above, the instance of the aggregated software component identifies the location of the corresponding session data that is closest to the software application's location and copies the session data locally onto the corresponding (third) virtual machine from this closest location, so as to restart the processing of the pending sessions seamlessly, with any next requests for the first instance of the software component that are submitted to the instance of the aggregated software component from now on to process the corresponding sessions as above (action "A16.Copy").

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
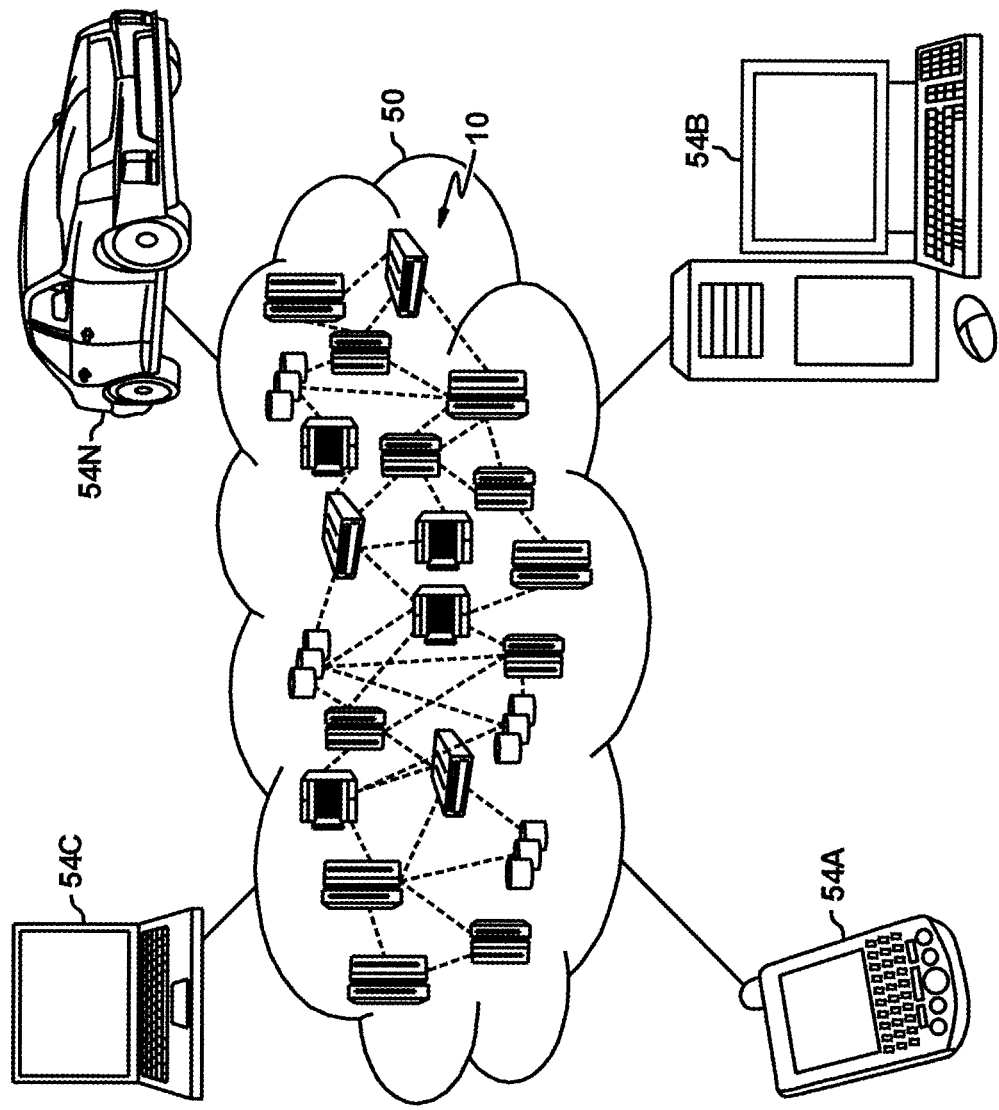
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
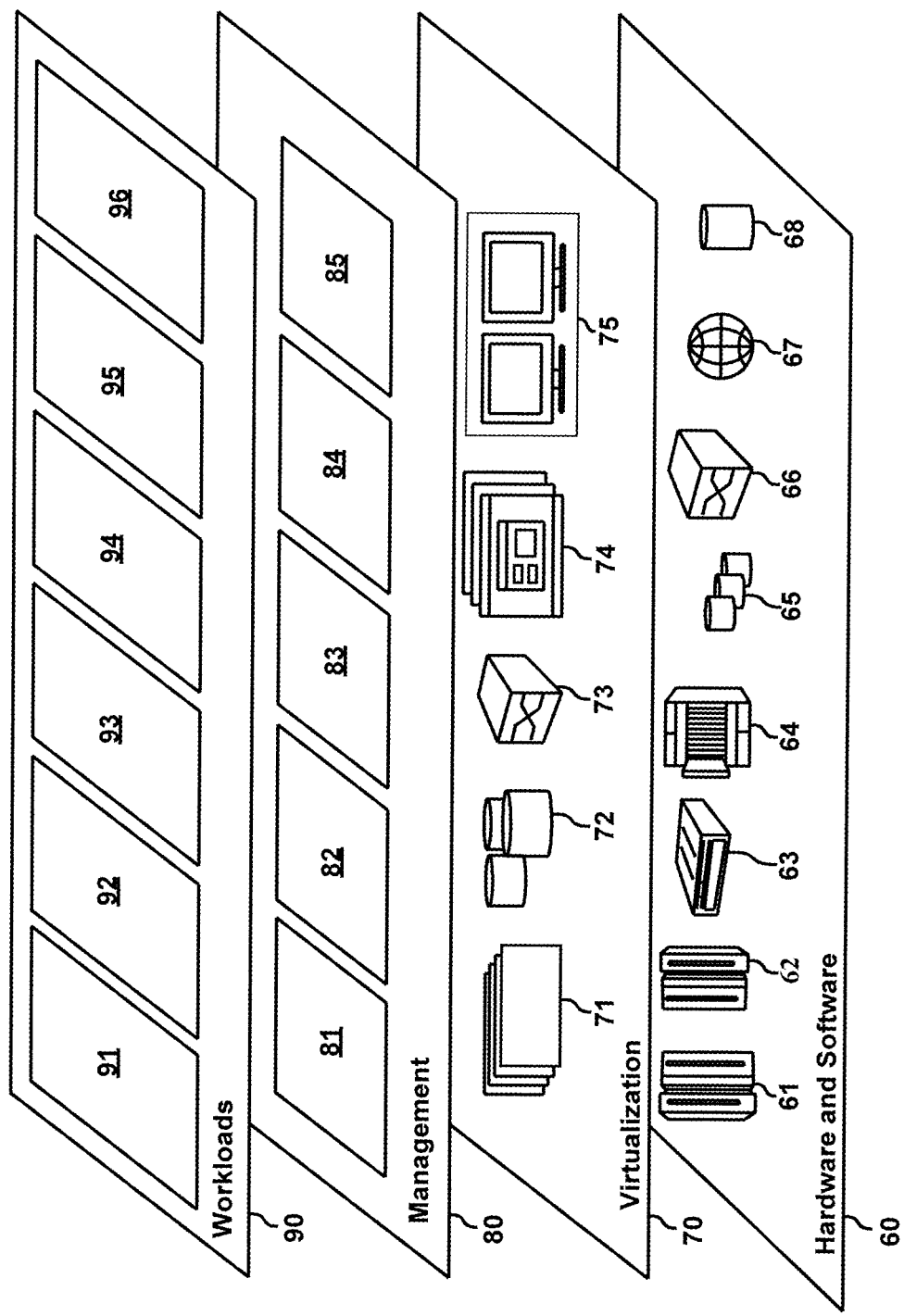
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks: virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management and Service Level Agreement (SLA) planning and fulfillment 84 provides cloud computing resource allocation and management such that required service levels are met. Service Level Agreement (SLA) planning and pre-arrangement for, and procurement of, cloud computing resources for which a future requirement is anticipated in accordance with an SLA respectively. Learning engine 85 provides directed graph generation and a decision-making logical framework according to embodiments of the invention.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and software application management 96.

In order to satisfy local and specific requirements, a person skilled in the art may apply many logical and/or physical modifications and alterations to the present disclosure. More specifically, although this invention has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method execution steps described in connection with any embodiment of the present invention may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a software application. However, the software application may be of any type (for example, a cloud software application, a standard software application).

In an embodiment, the method comprises deploying the software application in a default deployment configuration onto a computing system. However, the software application may be deployed in any way (for example, by means of any deployment package thereof, either built at runtime or offline) onto any computing system (see below).

In an embodiment, the default deployment configuration comprises a plurality of interacting software components of the software application. However, the software components may be in any number and of any type (for example, services, modules, libraries).

In an embodiment, the method comprises monitoring one or more operating indicators of an execution environment of the software application. However, the operating indicators may be in any number, of any type (for example, performance indicators, configuration indicators, availability indicators or any other indicators in any combination thereof) and in any form (for example, numbers, levels, flags). Moreover, the operating indicators may relate to the execution environment of the software application in any way (for example, with respect to the software application's software components, the computing machines where the software components run, the software components' connections, any other external services).

In an embodiment, the method comprises selecting a selected alternative deployment configuration among one or more alternative deployment configurations of the software application. However, the selected alternative deployment configuration may be selected in any way (for example, with a classification algorithm, fuzzy logic techniques) among any number of alternative deployment configurations.

In an embodiment, the selected alternative deployment configuration is selected in response to a passage to a critical condition of the execution environment according to the operating indicators. However, the critical condition may be defined in any way (for example, according to any combination of the operating indicators) and the passage thereto may be detected in any way (for example, as soon as a corresponding condition is fulfilled or only after this persists for two or more monitoring instants).

In an embodiment, each of the alternative deployment configurations has one or more groups of the software components aggregated into corresponding aggregated software components. However, each alternative deployment configuration may have any number of aggregated software components each comprising any number of software components (either the same or different throughout the alternative software components).

In an embodiment, the method comprises re-deploying the software application in the selected alternative deployment configuration onto the computing system. However, the software application may be re-deployed in any way (for example, in a complete or differential mode).

In an embodiment, the method comprises re-deploying the software application in the default deployment configuration onto the computing system in response to a return to a default condition of the execution environment from the critical condition according to the operating indicators. However, the default condition may be defined in any way (according to the definition of any number and type of critical conditions) and the passage thereto may be detected in any way (either the same or different with respect to the passage to the critical condition); in any case, the possibility is not excluded of defining two of more generic conditions of the software application that are all treated in the same way.

In an embodiment, the software application is deployed in a plurality of instances. However, the instances of the software application may be deployed in any way (for example, onto any number and type of data centers or any other computing systems) and in any number (down to a single one).

In an embodiment, each instance of the software application comprises one or more instances of the corresponding software components and/or aggregated software components. However, the instances of each software component and/or aggregated software component may be deployed in any way (for example, onto any number and type of virtual machines or any other computing machines) and in any number (down to a single one).

In an embodiment, the software components implement corresponding services. However, the services may be of any type (for example, standard, micro or nano services).

In an embodiment, the software application comprises one or more invocations of each of the services. However, the services may be invoked any number of times and in any way (for example, via messages, calls).

In an embodiment, the software components of each of the groups comprise one or more remote invocations of the services implemented by the software components of the group. However, the remote invocations may be in any number and of any type (for example, RESTful, SOAP).

In an embodiment, the corresponding aggregated software component of each group replaces the remote invocations with corresponding native invocations. However, the native invocations may be of any type (for example, functions, procedures).

In an embodiment, each of the aggregated software components incorporates a code of the corresponding software components. However, the code may be incorporated in any way (for example, by a corresponding instruction, copying the code); in any case, the possibility is not excluded of combining the functionalities of the software components into the corresponding aggregated software component by maintaining their code separate (for example, in different files).

In an embodiment, the software application is a cloud software application. However, the cloud software application may be of any type (for example, of public, hybrid, private type).

In an embodiment, said monitoring one or more operating indicators comprises monitoring one or more performance indicators, configuration indicators and/or availability indicators of the execution environment. However, different, additional, alternative operating indicators or any combination thereof are possible.

In an embodiment, the method comprises deploying the software application in a plurality of training deployment configurations (comprising the default deployment configuration and the alternative deployment configurations). However, the training deployment configurations may be in any number and of any type (down to the default deployment configuration and the alternative deployment configurations only).

In an embodiment, each of the training deployment configurations is deployed onto a plurality of training environments having different values of the operating indicators. However, the training environments may be in any number and of any type (for example, by varying any number and type of operating indicators in any way, either physically or virtually).

In an embodiment, the method comprises measuring one or more performance indicators of the software application in each of the training deployment configurations on each of the training environments. However, the performance indicators may be in any number, of any type (with different, additional, alternative performance indicators or any combination thereof that are possible) and in any form (for example, numbers, levels, flags).

In an embodiment, the method comprises determining a selection policy for selecting the alternative deployment configurations according to the operating indicators of the training environments and the corresponding performance indicators of the software application in the training deployment configurations. However, the selection policy may be defined in any way (for example, by a decision tree, a neural network, a polynomial or linear function, a Bayesian network) and it may be learned with any technique (for example, pruning the decision tree for avoiding over-fitting due to noise or coincidental regularities in the training examples) and in any way (for example, periodically either completely or incrementally); in any case, the possibility of pre-defining the selection policy manually is not excluded.

In an embodiment, the method comprises deploying the software application in the training deployment configurations comprising a plurality of candidate deployment configurations for the alternative deployment configurations. However, the candidate deployment configurations may be in any number and chosen in any way (for example, up to all the possible aggregations of the software components of the software application).

In an embodiment, the method comprises selecting the alternative deployment configurations among the candidate deployment configurations according to the operating indicators of the training environments and the corresponding performance indicators of the software application in the training deployment configurations. However, the alternative deployment configurations may be selected in any way (for example, with machine learning techniques); in any case, the possibility is not excluded of pre-defining the alternative deployment configurations manually.

In an embodiment, at least part of the software components are stateless. However, the stateless software components may be in any number (from none to all).

In an embodiment, at least part of the software components are stateful. However, the stateful software components may be in any number (from none to all).

In an embodiment, the method comprises the following steps for each first one of the instances of each of the stateful software components.

In an embodiment, in this case the method comprises maintaining corresponding session data of any sessions implemented by the first instance of the stateful software component onto a first computing machine of the computing system wherein the first instance of the stateful software component is deployed. However, the sessions may be in any number and their session data may be of any type and stored in any way (for example, in a common file, dedicated files, a database).

In an embodiment, in this case the method comprises mirroring the session data onto one or more mirroring computing machines of the computing system different from the first computing machine. However, the session data may be mirrored onto any number and type of (virtual/physical) computing machines (for example, the control virtual machine, one or more other execution virtual machines, one or more dedicated machines or any combination thereof).

In an embodiment, in this case the method comprises copying the session data from one of the mirroring computing machines to a second computing machine of the computing system wherein a second one of the instances of the stateful software component is deployed in response to a movement of the sessions from the first instance of the software component to the second instance of the software component. However, the mirroring computing machine may be selected in any way (for example, according to any number and type of parameters). In any case, the possibility of using the mirrored session data directly is not excluded.

In an embodiment, in this case the method comprises copying the session data from one of the mirroring computing machines to a third computing machine of the computing system wherein an instance of one of the aggregated software components comprising the first instance of the software component is deployed in response to a movement of the sessions from the first instance of the software component to the instance of the aggregated software component. However, the mirroring computing machine may be selected in any way (either the same or different with respect to the above-mentioned situation). In any case, the possibility of using the mirrored session data directly is not excluded.

Generally, similar considerations apply if the same solution is implemented with an equivalent method (by using similar execution steps with the same functions of more execution steps or portions thereof, removing some execution steps being non-essential, or adding further optional execution steps). Moreover, the execution steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (for example, the cloud manager) or even directly in the latter. Moreover, the computer program may run on any computing system (see below). In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the execution steps of the above-mentioned method. An embodiment provides a system comprising a circuitry (i.e., any hardware suitably configured, for example, by software) configured for performing each of the execution steps of the same method. However, the computing system may comprise any number and type of computing machines (for example, of physical and/or virtual type) and it may have any architecture (stand-alone or distributed with the computing machines communicating among them via any local, wide area, global, cellular or satellite network and exploiting any type of wired and/or wireless connections).

Generally, similar considerations apply if the system has a different structure or comprises equivalent software components or it has other operative characteristics. In any case, every software component thereof may be separated into more elements, or two or more software components may be combined together into a single element. Moreover, each software component may be replicated to support the execution of the corresponding operations in parallel. Moreover, unless specified otherwise, any interactivity between different software components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computing system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for deploying a software application, said method comprising:
   deploying the software application in a default deployment configuration onto a computing system, said default deployment configuration comprising a plurality of interacting software components of the software application;
   monitoring one or more operating indicators of an execution environment of the software application;
   ascertaining, from the monitored one or more operating indicators, that a critical condition of the execution environment exists;
   in response to said ascertaining, selecting an alternative deployment configuration from one or more alternative deployment configurations of the software application, each alternative deployment configuration having one or more groups of the software components aggregated into corresponding aggregated software components; and
   re-deploying the software application in the selected alternative deployment configuration onto the computing system.

2. The method of claim 1, wherein the method comprises:
   re-deploying the software application in the default deployment configuration onto the computing system in response to a return to a default condition of the execution environment from the critical condition according to the operating indicators.

3. The method of claim 1, wherein the software application is deployed in a plurality of instances, each instance comprising one or more instances of the corresponding aggregated software components.

4. The method of claim 1, wherein the software components implement corresponding services, said software application comprising one or more invocations of each service of the corresponding services.

5. The method of claim 4, wherein the software components of each group comprise one or more remote invocations of the services implemented by the software components of said each group, and wherein the corresponding aggregated software components replace the remote invocations with corresponding native invocations.

6. The method of claim 4, wherein each software component of the aggregated software components incorporates a code of the corresponding aggregated software components.

7. The method of claim 1, wherein the software application is a cloud software application.

8. The method of claim 1, wherein said monitoring one or more operating indicators comprises:
   monitoring one or more performance indicators, configuration indicators, and/or availability indicators of the execution environment.

9. The method of claim 1, wherein the method comprises:
   deploying the software application in a plurality of training deployment configurations comprising the default deployment configuration and the alternative deployment configurations each onto a plurality of training environments having different values of the operating indicators;
   measuring one or more performance indicators of the software application in each training deployment configuration on each training environment; and
   determining a selection policy for selecting the alternative deployment configurations according to the operating indicators of the training environments and the corresponding performance indicators of the software application in the training deployment configurations.

10. The method of claim 9, wherein the method comprises:
   deploying the software application in the training deployment configurations comprising a plurality of candidate deployment configurations for the alternative deployment configurations, and
   selecting the alternative deployment configurations among the candidate deployment configurations according to the operating indicators of the training environments and the corresponding performance indicators of the software application in the training deployment configurations.

11. The method of claim 1, wherein one or more software components of the software components are stateless.

12. The method of claim 3, wherein one or more software components of the software components are stateful, and wherein for each first instance of the instances of each stateful software component, the method comprises:
   maintaining corresponding session data of any sessions implemented by the first instance of the stateful software component onto a first computing machine of the computing system at which the first instance of the stateful software component is deployed;
   mirroring the session data onto one or more mirroring computing machines of the computing system different from the first computing machine;
   copying the session data from one of the mirroring computing machines to a second computing machine of the computing system, wherein a second instance of the instances of the stateful software component is deployed in response to a movement of the sessions from the first instance of the software component to the second instance of the software component; and
   copying the session data from one of the mirroring computing machines to a third computing machine of the computing system, wherein an instance of one aggregated software component of the aggregated software components comprising the first instance of the software component is deployed in response to a movement of the sessions from the first instance of the software component to the instance of the one aggregated software component.

13. A computer program product, comprising one or more computer readable hardware storage devices having computer readable program code stored therein, said program code containing instructions executable by one or more processors of a computer system to implement a method for deploying a software application, said method comprising, said method comprising:
   deploying the software application in a default deployment configuration onto a computing system, said default deployment configuration comprising a plurality of interacting software components of the software application;
   monitoring one or more operating indicators of an execution environment of the software application;
   ascertaining, from the monitored one or more operating indicators, that a critical condition of the execution environment exists;
   in response to said ascertaining, selecting an alternative deployment configuration from one or more alternative deployment configurations of the software application, each alternative deployment configuration having one or more groups of the software components aggregated into corresponding aggregated software components; and
   re-deploying the software application in the selected alternative deployment configuration onto the computing system.

14. The computer program product of claim 13, wherein the method comprises:
   re-deploying the software application in the default deployment configuration onto the computing system in response to a return to a default condition of the execution environment from the critical condition according to the operating indicators.

15. The computer program product of claim 13, wherein the software application is deployed in a plurality of instances, each instance comprising one or more instances of the corresponding aggregated software components.

16. The computer program product of claim 13, wherein the software components implement corresponding services, said software application comprising one or more invocations of each service of the corresponding services.

17. A computer system, comprising one or more processors, one or more memories, and one or more computer readable hardware storage devices, said one or more hardware storage device containing program code executable by the one or more processors via the one or more memories to implement a method for deploying a software application, said method comprising:
   deploying the software application in a default deployment configuration onto a computing system, said default deployment configuration comprising a plurality of interacting software components of the software application;
   monitoring one or more operating indicators of an execution environment of the software application;
   ascertaining, from the monitored one or more operating indicators, that a critical condition of the execution environment exists;
   in response to said ascertaining, selecting an alternative deployment configuration from one or more alternative deployment configurations of the software application, each alternative deployment configuration having one or more groups of the software components aggregated into corresponding aggregated software components; and
   re-deploying the software application in the selected alternative deployment configuration onto the computing system.

18. The computer system of claim 17, wherein the method comprises:
   re-deploying the software application in the default deployment configuration onto the computing system in response to a return to a default condition of the execution environment from the critical condition according to the operating indicators.

19. The computer system of claim 17, wherein the software application is deployed in a plurality of instances, each instance comprising one or more instances of the corresponding aggregated software components.

20. The computer system of claim 17, wherein the software components implement corresponding services, said software application comprising one or more invocations of each service of the corresponding services.

* * * * *